Patented Sept. 12, 1950

2,521,853

UNITED STATES PATENT OFFICE 2,521,853

RECOVERY OF LACTALBUMIN

George Josh, Crown Point, Ind., and Maurice E. Hull, La Grange, Ill., assignors to Armour and Company, Chicago, Ill., a corporation of Illinois No Drawing. Application September 14, 1946, Serial No. 697,163

6 Claims. (Cl. 260—122)

This invention relates to the recovery of lactalbumin from whey and the like.

In processes heretofore employed in the recovery of lactalbumin from whey, the precipitation of lactalbumin has been slow and has required a long settling period, and further a clean separation has not been obtained. Expensive recovery steps have been required to obtain the desired final product after a precipitation of the lactalbumin.

An object of the present invention is to provide a process whereby a rapid settling of lactalbumin can be obtained, the settled product being removed readily and being ready for use with or without further purification steps. A further object is to provide a process consisting of extremely simple and inexpensive steps for bringing about a quick precipitation of lactalbumin in a finished condition and in a condition for ready recovery by filtration, etc. Other specific objects and advantages will appear as the specification proceeds.

In one embodiment of the invention, the separated sweet whey (fat removed) is mixed with a small amount of coagulable protein. The mixture is then acidified to a pH of 4-5 and the mixture then heated, the above steps bringing about a combined coagulation of the added protein and the lactalbumin in the whey and causing a precipitation of the lactalbumin.

The added protein may be any coagulable protein, whether coagulated by heat or by acid. We find that particularly good results are obtained by the use of egg albumin, serum albumin, and also by skimmed milk, the casein of which is effective in the co-precipitation operation.

We find that highly effective results are obtained when the pH is brought within the range of 4-5. However, any suitable acid may be employed for the acidifying step.

The heating may be brought about by any means so as to bring the temperature above the coagulation points of both proteins, or of one protein if the other is coagulated by acid. We find that a temperature in the neighborhood of 200° F. gives excellent results. In the heating operation, steam is found to give especially good results because it allows for a rapid rise in temperature with a uniform coagulation and precipitation of the proteins.

After the heating step, the mixture is allowed to stand and immediately after the disappearance of the eddy currents caused by heating, the lactalbumin precipitates, the precipitation being clear-cut and rapid. The lactalbumin may be recovered by decantation, filtration, centrifugation, or other suitable method.

Examples of the process may be set out as follows:

Example I 15,000 pounds of separated sweet whey (fat removed) were mixed with 15 pounds of fresh egg albumin. The mixture was acidified to a pH of 4-5 with concentrated hydrochloric acid. The mixture was then heated with steam to a temperature of 200° F. and then allowed to settle. The liquid was decanted and the protein filtered to recover lactalbumin.

In the above operation, egg albumin, which coagulates at 150° F., was used to separate out the lactalbumin (coagulation point 190° F.). Similar results were obtained when blood albumin, dried egg white, and similar coagulable albumins were employed. The amount of egg albumin may vary from 0.05%–0.50%, with maximum results being achieved at the higher percentage.

Example II

The process as described in Example I was carried out with a small amount of skimmed milk being substituted for the fresh egg albumin. The mass was acidified to a pH of 4-5 and heated by steam to a temperature of 200° F. The mixture was then allowed to settle and the lactalbumin was recovered by filtration.

The use of serum albumin in place of egg albumin, as described in Example I, gives very similar results.

The new process has a number of advantages. It results in rapid flocculation and complete separation of the lactalbumin, a result that does not occur when acid alone is used to precipitate the lactalbumin. Again, the lactalbumin thus prepared is ready for use. With other methods of precipitation, it has been necessary to use additional steps of an expensive and tedious character to recover the lactalbumin in form for use. For example, filtercel is often added to the whey and it is then later necessary to reseparate the lactalbumin from the filtercel. Finally, when washing the lactalbumin produced by our process to remove lactose, this can be done with a minimum loss of the lactalbumin because the co-precipitated lactalbumin of this process can be resuspended and immediately filtered. Lactalbumin separated by prior methods will pass through a filter if resuspended.

The temperatures generally found desirable in the process are those within the range of 175°–212° F. A higher temperature may be employed if desired. The temperatures will vary depending upon the character of the coagulable protein added.

While in the foregoing process, we have set out some of the steps in considerable detail for the purpose of illustrating one mode of carrying out the invention, it will be understood that such details may be varied widely by those skilled in the art without departing from the spirit of our invention.

1. In a process for recovering lactalbumin from whey, the steps of adding a coagulable protein to the whey, adjusting the pH to about 4-5, heating the mixture above the coagulation point of said protein and the lactalbumin of the whey, and separating said protein and the lactalbumin from the liquid.

2. In a process for recovering lactalbumin from whey, the steps of adding to the whey a coagulable protein, adjusting the pH to approximately 4-5, heating the mixture to coagulate the added protein and the protein lactalbumin of the whey to bring about a precipitation of the said proteins, and separating the precipitated proteins from the liquid.

3. In a process for recovering lactalbumin from sweet whey, the steps of adding a coagulable protein to the whey, acidifying to a pH of 4-5, heating the acidified mixture above the coagulation point of the added protein and the protein of the whey, and separating the coagulated proteins from the liquid.

4. In a process for recovering lactalbumin from whey, the steps of adding egg albumin in an amount of .05-50% to the whey, adjusting the pH to approximately 4-5, heating the acidified mixture to a temperature of about 175-212° F. to coagulate the egg albumin and the protein of the whey, and separating the coagulated proteins from the liquid.

5. In a process for recovering lactalbumin from whey, the steps of adding blood serum to the whey, adjusting the pH to approximately 4-5, heating the mixture to a temperature above the coagulation point of the blood serum and the lactalbumin, and separating the coagulated proteins from the liquid.

6. In a process for recovering lactalbumin from whey, the steps of adding skimmed milk to the whey, adjusting the pH to approximately 4-5, heating the mixture above the coagulation point of the added protein, skimmed milk, and the protein of the whey, and separating the coagulated proteins from the liquid.

GEORGE JOSH.
MAURICE E. HULL.

REFERENCES CITED

The following references are of record in the file of this patent:

UNITED STATES PATENTS

| Number | Name | Date |
|---|---|---|
| 1,815,160 | Oppenheim | July 21, 1931 |
| 2,251,334 | Hall | Aug. 5, 1941 |
| 2,388,991 | Oatman | Nov. 13, 1945 |

FOREIGN PATENTS

| Number | Country | Date |
|---|---|---|
| 121,530 | Germany | July 17, 1901 |
| 134,186 | Germany | Sept. 5, 1902 |